July 22, 1952     E. C. WALKER ET AL     2,604,014
MISSILE LAUNCHER
Filed Oct. 20, 1949     2 SHEETS—SHEET 1
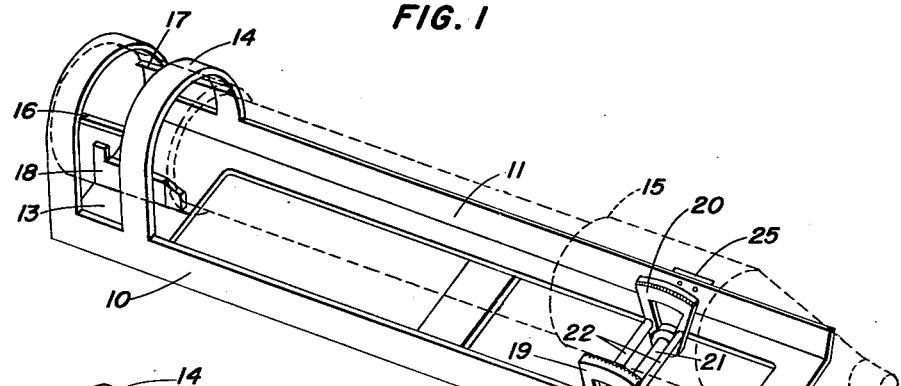
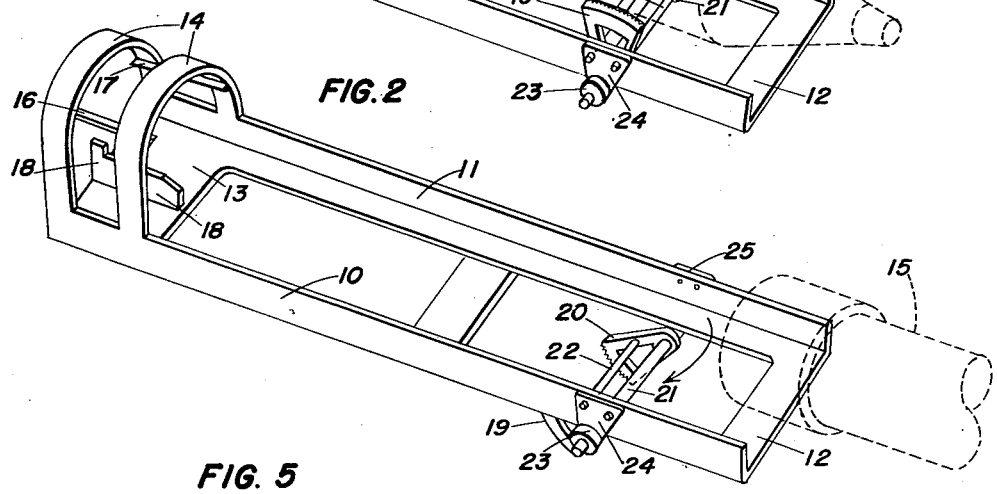
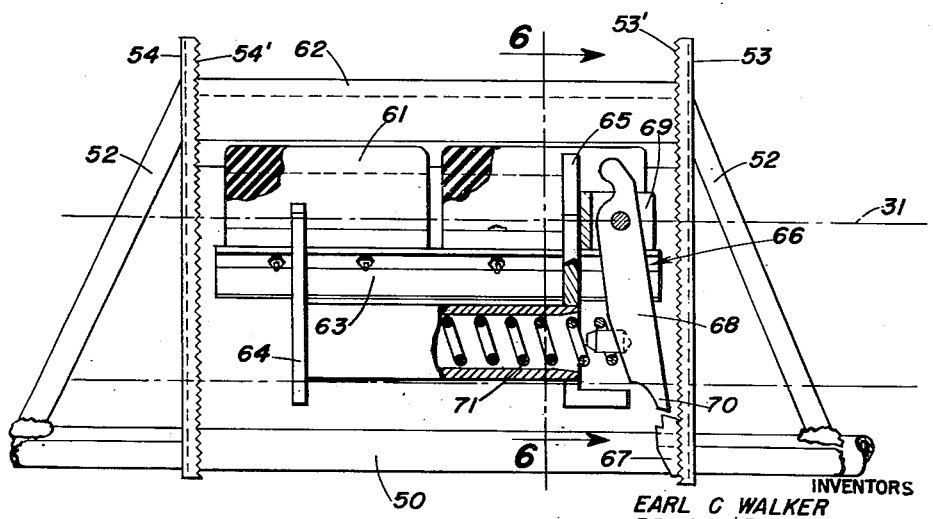
INVENTORS
EARL C WALKER
ROBERT B. ELLIOTT
JOHN D. BASCOM
BY *A. D. O'Brien*
ATTORNEY July 22, 1952     E. C. WALKER ET AL     2,604,014
MISSILE LAUNCHER
Filed Oct. 20, 1949     2 SHEETS—SHEET 2

INVENTORS
EARL C. WALKER
ROBERT B. ELLIOTT
JOHN D. BASCOM
BY
ATTORNEY

Patented July 22, 1952

2,604,014

UNITED STATES PATENT OFFICE 2,604,014

MISSILE LAUNCHER

Earl C. Walker, Beverly Hills, Robert B. Elliott, South Pasadena, and John D. Bascom, Pasadena, Calif., assignors to the United States of America as represented by the Secretary of the Navy Application October 20, 1949, Serial No. 122,564

3 Claims. (Cl. 89—1.7)

This invention relates to launchers and more particularly to a launcher wherein the rocket may be launched with a maximum degree of accuracy.

In the usual type of launcher the rocket is supported by a rack comprising a plurality of rails which serve to guide the missile until it acquires sufficient speed to maintain its course in flight. When a rocket is fired from such prior art constructions the front end of the missile is unsupported after it clears the end of the guide rack while the rear end remains momentarily supported, hence at this moment the front of the missile tends to drop since the force of gravity is effective upon the front end only. This causes the missile to deviate from its intended course.

It is therefore an object of the present invention to provide a launcher for rockets which will release both ends of the rocket simultaneously so that the force of gravity may act on both ends equally and misdirection of the missile caused by the unequal support by the launcher will be obviated.

Another object of the invention is to provide a rocket launcher which will accurately align the missile on the intended course and which imposes a minimum amount of frictional resistance to the rocket's launching.

Still another object of this invention is to provide a light, compact, portable rocket launcher which is simple in construction, foolproof in operation, and launches the missile with a minimum amount of interference with the rocket's course.

A further object is the provision of suitable means for preventing rebound of the launcher parts with possible interference with the rocket during flight.

Other objects and advantages will become apparent during the course of the following description taken in conjunction with the accompanying drawings wherein:

Fig. 1 is a perspective view of the present invention embodied in a rocket launcher and shows in dotted lines a rocket ready to be fired;

Fig. 2 is a change position view of the embodiment illustrated in Fig. 1 showing the position of the parts immediately after the rocket has been fired;

Figure 3:
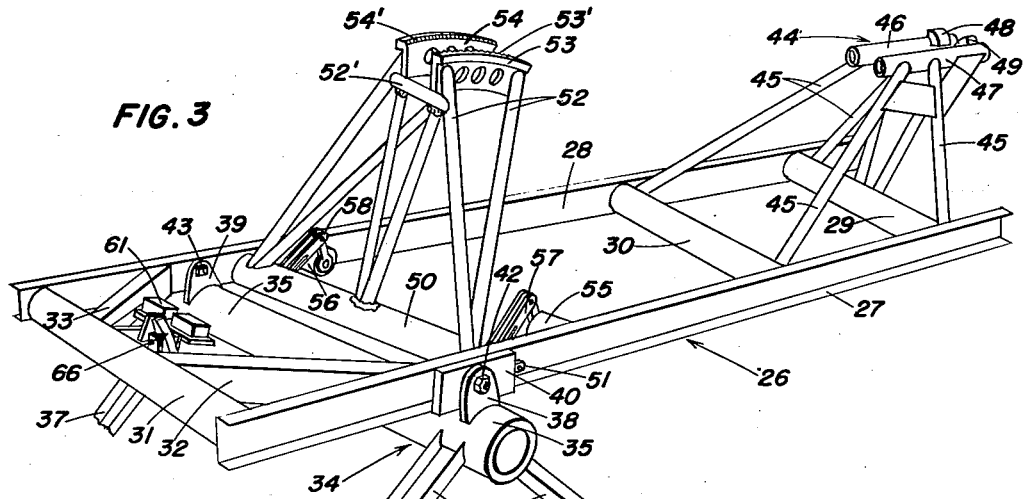
Fig. 3 is a perspective view taken from the left front side of a larger form of rocket launcher embodying the present invention.
Figure 4:
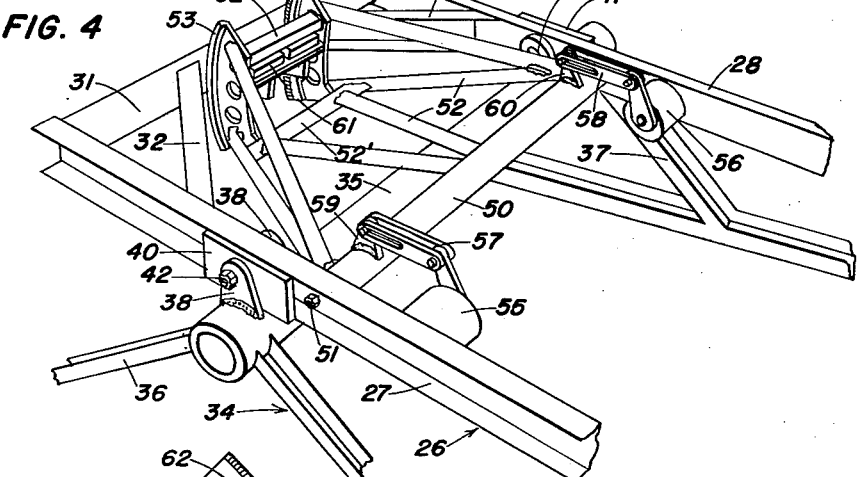
Fig. 4 is a fragmentary perspective view taken from the left rear side of the embodiment illustrated in Fig. 3 and showing the position of the parts after a rocket has been fired.
Figure 6:
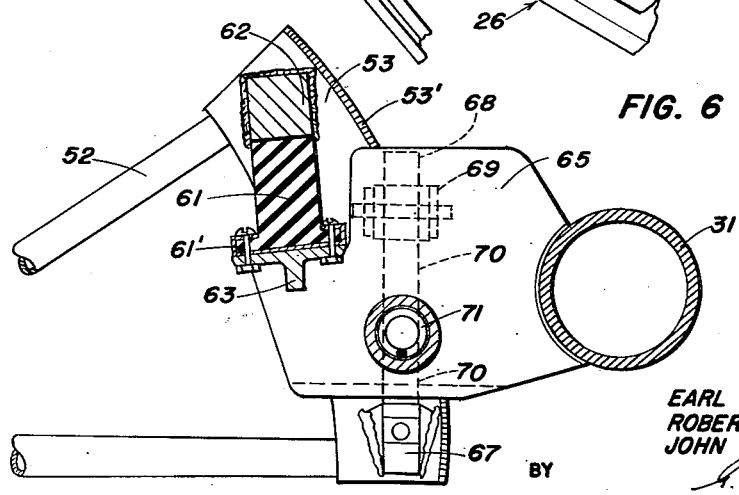

Fig. 5 is an enlarged detailed front elevation with portions broken away of a portion of the embodiment illustrated in Figs. 3 and 4 showing the catch whereby the swingable support for the forward end of the rocket is latched in down position after a rocket has been fired; and Fig. 6 is an enlarged detailed section, partially in elevation of the embodiment illustrated in Fig. 5 taken on a line substantially corresponding to line 6—6 of Fig. 5.

Referring to the drawings in detail and particularly to the embodiment illustrated in Figs. 1 and 2, it will be noted that this embodiment comprises a frame formed from two spaced elongated angle rails 10 and 11 interconnected front and rear by webs 12 and 13. At the rear of the launcher the angle members are also interconnected by a cage 14 large enough to receive and encompass the rear end of a rocket 15 in the manner illustrated in Fig. 1. Circumferentially disposed within this cage are short guide bars 16 and 17 which, in cooperation with a lower guide member 18, serve to provide three point engagement about the periphery of the rocket base so as to retain the rocket in place.

The forward end of the rocket may be supported on a pair of spaced arcuate segments 19 and 20 which are mounted on a stub shaft 21 and interconnected by spacer rods 22. The ends of this stub shaft may be journaled in suitable bushings 23 formed in the lower ends of spaced depending journal members 24 and 25 secured to the outside of the frame as shown. The inner edges of the segments 19 and 20 which contact the rocket may be serrated as shown to inhibit slippage and thus to insure coincidental movement of the segments with the rocket in its take-off.

It will be apparent that with the arcuate segments 19 and 20 disposed upwardly and supporting a rocket as shown in Fig. 1 the rocket is cradled against lateral displacement and yet there is offered a minimum amount of resistance to the forward movement of the rocket when it is fired. Furthermore, by proper positioning of the segments in alignment with a reference mark or a suitable stop (not shown), the support provided by the sector may terminate at the same time that the rear of the rocket drops off the forward end of the lower guide member 18. Thus both ends of the rocket are airborne simultaneously and the rocket proceeds on its aimed course.

Considering now the embodiment illustrated in Figs. 3 to 6, there is shown a larger rocket launcher embodying the present invention. This launcher comprises a base frame 26 formed from two spaced elongated channel beams 27 and 28 interconnected by means of a plurality of fixed cross supports 29, 30, and 31, welded or otherwise secured to the channel beams. For additional rigidity, the frame may be provided at its forward end with a pair of diagonal corner braces 32 and 33 positioned as shown.

The launcher may be supported near its forward end on a stand 34 comprising a crossbar 35 having secured at each end a pair of diagonally disposed legs 36 and 37. Rigidly mounted on the crossbar 35 near each end is a pair of spaced upwardly extending lugs 38 and 39, each pair adapted to embrace its respective channel beam 27 and 28 and suitable spacing plates 40 and 41, which in turn are hinged to the lugs by means of pivot pins 42 and 43, as shown. It will be thus apparent that the launcher may be tilted to various elevation angles by the provision of any suitable elevating mechanism (not shown) operating to tilt the launcher about the pivot pins.

Mounted on the base frame 26 is a platform or rear support 44 for the base of a rocket, which platform may be supported by a plurality of struts 45 substantially as shown in Fig. 3. The platform 44 comprises a pair of spaced guide rails 46 and 47 parallel to the base frame 26 and adapted to cradle the rear end of a rocket between them. Stops 48 and 49 may be mounted upon each guide rail and against the stops the base of a rocket abuts when it is mounted in the launcher.

Near the forward end of the frame there is provided a cross-shaft 50 the ends 51 of which extend through and are journaled in the channel beams 27 and 28. Mounted on the shaft 50 by means of struts 52 is a pair of spaced arcuate segments 53 and 54 interconnected by a cross brace 52' and a crossbar 62 as illustrated in Figs. 3 and 4. The distance between the segments 53 and 54 is less than the diameter of the rocket that the segments are designed to support and launch so that the forward end of the rocket is cradled against lateral displacement. Serrations 53' and 54' may be provided as shown to increase frictional contact between the segments and rocket to insure simultaneous movement of the segments with the rocket in its take-off.

When a rocket is fired it will move forward, rotating the sectors 53 and 54 about the ends 51 of their support shaft 50. By the design of the parts the support offered to the forward end of the rocket will be withdrawn at the same time that the base of the rocket moves off the forward ends of the rails 46 and 47 and hence both ends of the rocket are airborne simultaneously. In view of this action the rocket is not tilted or disturbed in its forward motion.

To arrest and cushion the motion of the segments 53 and 54 as they swing forwardly and downwardly, suitable snubbers 55 and 56 of the type conventionally used on automobiles, may be employed. These snubbers may be mounted on the channel beams 27 and 28 and connected by slotted link arms 57 and 58 to lugs 59 and 60 welded or otherwise secured to the cross-shaft 50. The slots in said link arms are of such length that the snubbers are not brought into action until the sections have moved sufficiently to break their contact with and their support of the rocket. In addition, resilient cushions 61 may be carried by the forward end of the frame 26 and are adapted to be engaged by the bar 62 interconnecting the segments 53 and 54. The cushions 61 are mounted in the frame in any convenient manner such as being bolted through integral flanges 61' to the top of a T-shaped crossbar 63 which in turn is secured to a pair of spaced ledged plates 64 and 65 welded or otherwise secured to the forward crossbar 31 substantially as shown in Figs. 5 and 6.

In order to prevent the segments from rebounding off the cushions 61 into the path of the fired rocket before it has passed beyond the launcher, a latch 66 may be provided. This latch is illustrated in Figs. 5 and 6 and comprises a tooth 67 which is carried on the lower inner surface of the segment 53 and adapted to ride past a detent lever 68 which is pivotally supported by a bracket 69 welded or otherwise secured to the outer face of the support plate 65. The lower end 70 of the detent 68 is normally urged outwardly by a spring 71 to engage the latch 67 as the segments descend and effectively prevent rebounding of the segments from the cushions 61.

It will be apparent that with suitable modification of the supporting structure the launcher of the present invention could be employed to launch rockets of the vane stabilized types and the use of the present launcher for such purposes is within the purview of the present invention. Hence, it should be understood that the invention need not be confined to the exact structure and arrangement of parts shown and described.

What is claimed is:

1. An elongated missile launcher comprising a frame extending in the missile launching direction, a rear missile support on said frame, and a front sector-shaped missile support including an arcuate supporting member, said sector-shaped support being pivoted transversely of the frame so that said arcuate member is swingable in the missile launching direction from a normal supporting position to an angularly displaced position spaced from the missile launching path, the spacing of said front and rear supports being such that said front support is movable out of missile supporting position simultaneously with the withdrawal of the missile from the rear support whereby the missile is clear of both supports simultaneously.

2. A missile launcher comprising a frame, means for elevating one end of said frame so as to aim the missile, spaced means for supporting a missile in apposition to said frame, one of said supporting means including a fixed short guideway and the other of said support comprising a swingable short guideway which may be swung clear of the rocket by its forward motion, and means for decelerating the movable guide section in its swinging movement.

3. A missile launcher comprising a frame, means for elevating one end of said frame so as to aim the missile, spaced supports for supporting a missile in apposition to said frame, one of said supports including a fixed short guideway and the other of said supports comprising a swingable short guideway which may be swung clear of the missile by its forward motion, means for decelerating the movable guide section in its swinging movement, and latch means for positively retaining the movable support clear of the path of the missile.

EARL C. WALKER.
ROBERT B. ELLIOTT.
JOHN D. BASCOM.

REFERENCES CITED

The following references are of record in the file of this patent:

UNITED STATES PATENTS

| Number | Name | Date |
| --- | --- | --- |
| 1,043,169 | Tenow et al. | Nov. 5, 1912 |
| 2,414,579 | Anderson | Jan. 21, 1947 |
| 2,481,542 | Schuyler | Sept. 13, 1949 |
| 2,549,778 | Crawley | Apr. 24, 1951 |
| 2,550,159 | Mickelson | Apr. 24, 1951 |